June 16, 1925.
C. C. FARMER
SLACK ADJUSTER
Filed June 24, 1924
1,541,935
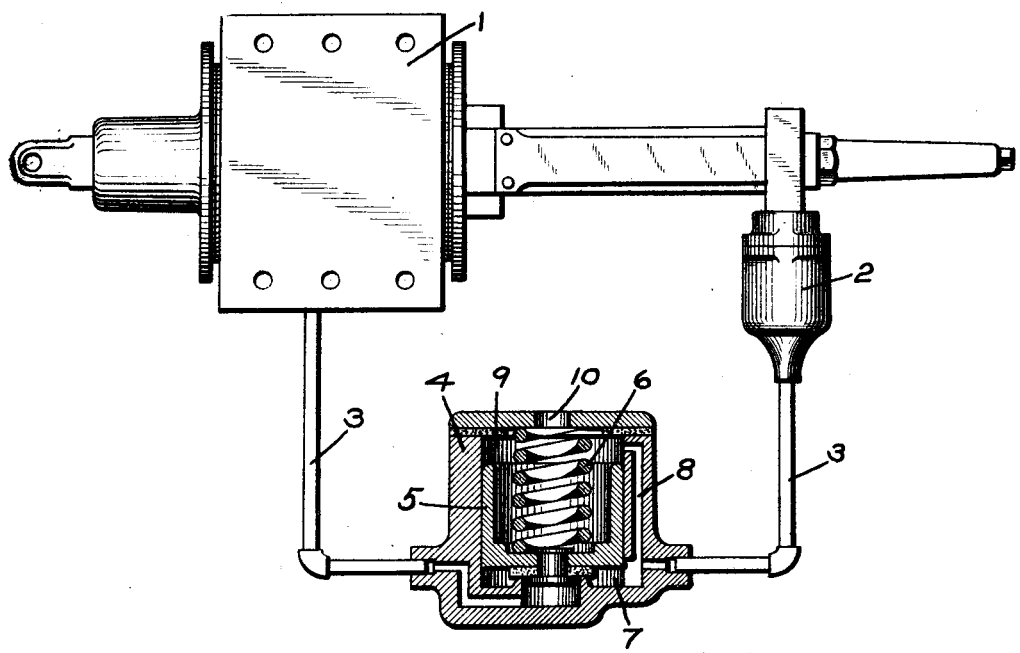
INVENTOR
CLYDE C. FARMER
BY *Wm. M. Cady*
ATTORNEY Patented June 16, 1925.

1,541,935

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SLACK ADJUSTER.

Application filed June 24, 1924. Serial No. 722,020.

*To all whom it may concern:*

Be it known that I, CLYDE C. FARMER, a citizen of the United States, residing at Pittsburgh, in the county of Allegheny and State of Pennsylvania, have invented new and useful Improvements in Slack Adjusters, of which the following is a specification.

This invention relates to fluid pressure brakes and more particularly to means for taking up the slack due to the wear of the brake shoes on the wheels.

It has heretofore been proposed to provide a fluid pressure operated slack adjuster which is supplied with fluid under pressure from the brake cylinder when the brake cylinder piston has moved out a predetermined distance (usually eight inches) in applying the brakes. The slack adjuster is so constructed that when fluid under pressure is supplied to same, the parts are moved into a position for taking up slack, so that when fluid is released from the slack adjuster in releasing the brakes, the slack adjuster will operate to take up slack.

It will thus be seen that the above described slack adjuster operates to take up slack whenever the brake cylinder piston moves beyond the predetermined distance, regardless of the brake cylinder pressure.

Particularly where the brake rigging has considerable spring, the brake cylinder piston may move out beyond the point where fluid is supplied to the slack adjuster when only a light application of the brakes is made and before the brake shoes have been applied to the wheels. Such movement is known as "false" piston travel and if the slack adjuster acts to take up slack upon false piston travel as well as true piston travel, the adjustments will be made too often and too rapidly to correspond, as they should, with the slack caused by the wear of the brake shoes on the wheels.

The principal object of my invention is to provide means in connection with a slack adjuster for overcoming the above difficulty.

In the accompanying drawing, the single figure illustrates a brake cylinder and a slack adjuster with my improvement applied thereto.

As shown in the drawing, the usual brake cylinder 1 is provided with a fluid pressure operated slack adjuster 2, the construction of which is well known and which is deemed unnecessary to describe for a clear understanding of the invention.

The pipe 3 which supplies fluid from the brake cylinder 1 to the slack adjuster 2 is connected in the usual manner with a port in the brake cylinder which is positioned so as to be uncovered to admit air to the pipe upon movement of the brake cylinder piston beyond a predetermined point in applying the brakes and according to my invention there is interposed in the pipe 3 a valve device 4 for controlling communication through said pipe from the brake cylinder 1 to the slack adjuster 2.

The valve device 4 may comprise a casing containing a valve piston 5 adapted to be normally held seated, cutting off communication through pipe 3 by the action of a spring 6. The chamber 7 at one side of the valve piston 5 is connected to the slack adjuster side of pipe 3 and there is a passage 8 connecting said chamber with the chamber 9 at the opposite side of the valve piston, chamber 9 being open to the atmosphere through a port 10.

The brake cylinder side of pipe 3 leads to the inner seated area of the valve piston 5, so that when the valve piston 5 is in its seated position, communication through pipe 3 is closed.

In operation, when the brakes are applied, the brake cylinder piston is moved out by fluid under pressure in the usual manner, and if movement of the piston exceeds the predetermined piston travel, the port leading to pipe 3 will be uncovered to permit flow of fluid under pressure from the brake cylinder to pipe 3.

The spring 6 of the valve device 4 is such as to hold the valve piston 5 in its closed position against the pressure supplied to the brake cylinder side of pipe 3 and the seated area of valve piston 5, until the brake cylinder pressure has been increased to a predetermined degree, for example, forty pounds, when the valve piston will be lifted from its seat. As soon as the valve piston lifts, the full area of same will be exposed to brake cylinder pressure and will cause the quick positive movement of same to its upper position.

Fluid under pressure is then supplied to the slack adjuster 2 so as to move the parts thereof to the position preparatory to taking up slack. The valve piston seats in its upper position, so that the exhaust port 10 is cut off from passage 8, thus preventing the escape of fluid from pipe 3.

When the brakes are released and the brake cylinder pressure has been reduced to a low point, the spring 6 will shift the valve piston to its lower seat and fluid in the slack adjuster side of pipe 3 and on the slack adjuster will be vented to the atmosphere through passage 8 and port 10. The slack adjuster will then operate in the usual manner to take up slack.

With the above described construction, it will be seen that the slack adjuster will not operate even if the brake cylinder piston should move beyond the predetermined piston travel, unless the brake cylinder pressure is increased to a predetermined degree, such that application of the brake shoes to the wheels with considerable force is effected. The taking up of slack through "false" piston travel is thus prevented.

Having now described my invention, what I claim as new and desire to secure by Letters Patent, is:—

1. The combination with a brake cylinder and a fluid pressure operated slack adjuster operated by fluid supplied from the brake cylinder, of a valve device for controlling communication through which fluid under pressure is supplied from the brake cylinder to the slack adjuster.

2. The combination with a brake cylinder and a slack adjuster operated by fluid supplied from the brake cylinder, of valve means controlling communication through which fluid is supplied from the brake cylinder to the slack adjuster and operated upon a predetermined increase in brake cylinder pressure for opening said communication.

3. The combination with a brake cylinder and a slack adjuster operated by fluid supplied from the brake cylinder upon a predetermined travel of the brake cylinder piston in applying the brakes, of means for preventing the admission of fluid to the slack adjuster until the brake cylinder pressure has been increased to a predetermined degree.

4. The combination with a brake cylinder and a fluid pressure operated slack adjuster, of means for supplying fluid from the brake cylinder for operating said slack adjuster only upon a predetermined travel of the brake cylinder piston and upon a predetermined increase in brake cylinder pressure.

5. The combination with a brake cylinder and a slack adjuster operated by fluid supplied from the brake cylinder in applying the brakes, of valve means for controlling communication through which fluid under pressure is supplied from the brake cylinder to the slack adjuster and for controlling communication from the slack adjuster to an exhaust port.

In testimony whereof I have hereunto set my hand.

CLYDE C. FARMER.